(12) United States Patent
Tirler et al.

(10) Patent No.: US 12,725,879 B2
(45) Date of Patent: Sep. 1, 2026

(54) PROTECTIVE HOUSING FOR BATTERIES

(71) Applicant: Eco-Research, Bozen Bolzano (IT)

(72) Inventors: Werner Tirler, Bolzano (IT); Giulio Voto, Bolzano (IT)

(73) Assignee: Eco-Research, Bozen-Bolzano (IT)

( * ) Notice: Subject to any disclaimer, the term of this patent is extended or adjusted under 35 U.S.C. 154(b) by 609 days.

(21) Appl. No.: 18/249,777

(22) PCT Filed: Oct. 18, 2021

(86) PCT No.: PCT/EP2021/078754
§ 371 (c)(1),
(2) Date: Apr. 20, 2023

(87) PCT Pub. No.: WO2022/084220
PCT Pub. Date: Apr. 28, 2022

(65) Prior Publication Data

US 2024/0006710 A1 Jan. 4, 2024

(30) Foreign Application Priority Data

Oct. 23, 2020 (IT) ........................ 102020000025162

(51) Int. Cl.
*H01M 50/367* (2021.01)
*H01M 50/209* (2021.01)
*H01M 50/30* (2021.01)

(52) U.S. Cl.
CPC ....... *H01M 50/367* (2021.01); *H01M 50/209* (2021.01); *H01M 50/394* (2021.01)

(58) Field of Classification Search
CPC .... H01M 50/20; H01M 50/434; H01M 50/30; H01M 50/367
See application file for complete search history.

(56) References Cited

U.S. PATENT DOCUMENTS

2005/0170238 A1 8/2005 Abu-Isa et al.
2009/0252994 A1* 10/2009 Livingston .......... H01M 10/625 429/1

(Continued)

FOREIGN PATENT DOCUMENTS

CN 204130610 1/2015
CN 205543089 8/2016
CN 107785954 3/2018

OTHER PUBLICATIONS

Machine Translation of: He (JP 204130610 U), Jan. 28, 2015.*
International Search Report, Dec. 2, 2021.

*Primary Examiner* — Kenneth J Douyette
(74) *Attorney, Agent, or Firm* — Dunlap Bennett & Ludwig PLLC

(57) ABSTRACT

A protective housing (100) for batteries, accumulators and electrical cells, with a body (101) which forms a chamber (105) for accommodating the battery, accumulator and/or electrical cells. The housing has at least one chamber, wherein this chamber extends over at least one surface forming at least one wall of the housing and forms a cavity to receive water therein. The cavity has at least one one-way valve for relieving excess pressure and an inlet channel for filling the cavity with water, and the chamber has at least one connection via an electrical cable (107) to the outside of the housing (100) and at least one inner surface (109) of the housing forming the cavity in which the thermally conductive water is present.

7 Claims, 1 Drawing Sheet

(56) References Cited

U.S. PATENT DOCUMENTS

| | | | | |
|---|---|---|---|---|
| 2012/0244404 | A1* | 9/2012 | Obasih ................ | H01M 10/615 429/120 |
| 2020/0220135 | A1 | 7/2020 | Pedersen | |

* cited by examiner

PROTECTIVE HOUSING FOR BATTERIES

BACKGROUND OF THE INVENTION

The invention relates to a protective housing for batteries, accumulators and electrically chargeable cells and all means used to store electrical energy.

Due to the increased use of rechargeable batteries and accumulators, the problem of handling batteries and accumulators, which are often connected to photovoltaic systems, as security in the event of a lack of electricity from the grid or which are used, for example, to operate vehicles such as bicycles, i.e. which can be taken from the electric vehicle and charged in buildings, etc. is increasingly posed.

These accumulators and/or batteries pose a risk of explosion, with the risk of buildings and homes catching fire and/or the emergency services being unable to intervene to extinguish the flames due to the risk of the batteries, accumulators and rechargeable electric cells exploding.

Even small batteries, e.g. used to power bicycles and electric scooters can cause a fire while the battery is charging.

With the widespread use of photovoltaic systems, there is also a need to store excess electrical energy in accumulators, batteries or the like. These are often integrated into a wall of a house and have an average storage capacity of 10 kWh and a size of approx. 0.2 $m^3$. With these systems it is possible to cover the daily power requirement even when the sky is overcast. Among the aspects that limit the widespread use of these very practical systems is the security aspect. In the event of a malfunction and given the significant energy load, it is possible that the system will overheat and the whole house will catch fire.

In order to avoid this danger, it is necessary to limit the possible overheating of the electrical energy storage. With the present invention, this risk should be reduced to a minimum. In the event of a fire, water is often used to extinguish due to its high heat capacity and ease of use. In the proposed method, water is also used as an energy absorber that could be released from the storage system in the event of a disruption. In the case of accumulators with a capacity of 10 kWh, thermal energy of approx. 8,500 Kcal can be released, which can overheat the system to a very dangerous temperature.

A variety of casings are known which protect batteries, accumulators, rechargeable electric cells from external fire and/or which protect the exterior from a possible explosion which could possibly result in a battery fire.

Since US 20050170238 a housing made of a polymeric material is known which is resistant to flames and offers a heat shield to protect a device with a battery inside.

The Chinese utility model CN205543089 describes a lithium-ion battery with an outer sealing shell in which the battery to be sealed is housed. A cavity is left between the sealing shell and the battery. The cavity is filled with inert gas and must have an anodized rod at its negative end. There are valves for venting and filling the gas.

The purpose of the cover described is to prevent the battery from heating up as a result of its own heating.

SUMMARY OF THE INVENTION

It is an object of the present invention to realize a protective housing for batteries, accumulators and electric cells, which absorbs the energy inside the accumulator etc., thereby reducing and/or eliminating the risk of fire and/or preventing explosion during fire, because it dissipates the potential energy inside the battery etc.

This aim is achieved by a protective housing for batteries, accumulators and electrical cells according to the characterizing part of the claims.

A protective housing for batteries, accumulators and electric cells is proposed, which comprises an inner chamber for accommodating a battery, an accumulator and/or electric cells.

According to the invention, at least one chamber is formed in the housing. This chamber has at least one surface forming at least one wall of the housing and forms a cavity formed with an object housed in it, in which water (H2O) is present, and this cavity has at least one one-way valve for relieving excess pressure and one Inlet channel for filling the chamber with water.

Preferably the chamber is accessible through a door. In a further embodiment, the battery, the accumulator and/or the electrical cells are fitted inside the housing.

Advantageously, the outer walls of the housing are insulated from the outside, i.e. they do not allow heat transfer between the outside and the cavity in which the water is located and/or the chamber in which the battery, accumulator and/or electric cell is arranged.

The interior of the housing, in which the battery, the accumulator and/or the electric cell is arranged, is connected to at least one power supply line, for example for charging the battery. Advantageously, the battery is connected to the electrical system of the house, both at the input and at the output, so that it acts as a backup if, for example, it is recharged by the energy of the photovoltaic panels during the day and powers the house in the evening when there is no electricity supply from the photovoltaic system.

DESCRIPTION OF THE DRAWING

An example of a protective housing according to the invention is described below with reference to an attached FIGURE, in a non-limiting manner. It shows.

DETAILED DESCRIPTION OF THE INVENTION

Figure 1:
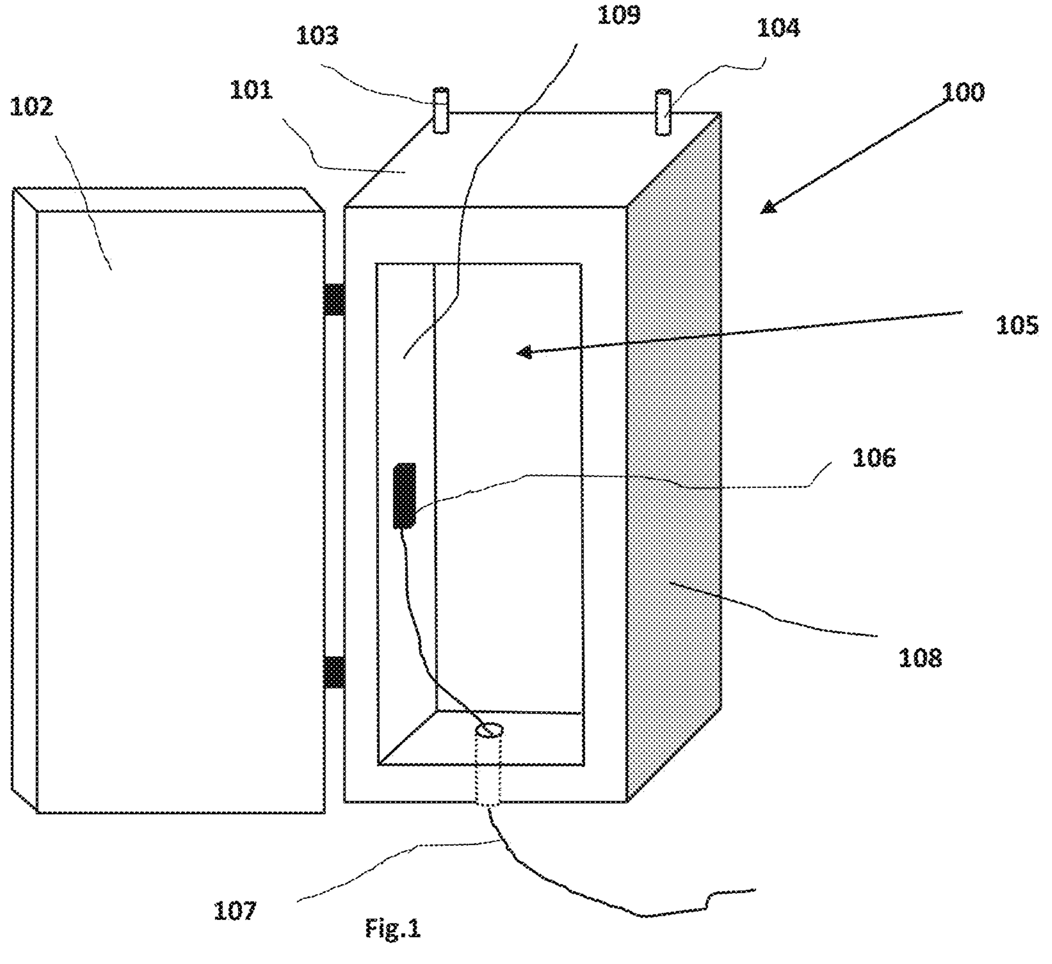
FIG. 1: a schematic perspective view of a protective box showing a preferred embodiment of the system according to the invention.

FIG. 1 shows a protective housing for batteries, accumulators and/or electric charging cells with the reference number 100. This housing 100 has a body 101 defining an interior, a chamber 105 in which the battery can be arranged. The battery arranged in the chamber 105 can only be inserted into the chamber for charging the battery, e.g. by means of a power supply 106 which is connected to an external network via a cable 107, or in a further form of radiation, a battery, an accumulator, an electric charging cell can be permanently arranged in the chamber 105. In the second variant, not shown, in which the battery is fixed in the chamber 105 of the protective housing 100, a door for accessing the interior is not required.

Several batteries can also be arranged in the interior at the same time. The interior is thermally connected to a cavity formed in the wall of the protective box. This cavity is connected, for example, by a metal surface that conducts heat from the chamber into the cavity. The cavity is provided with a pipe and/or an inlet channel 104 through which the cavity is filled with water. The amount of water is adjusted according to the capacity of the batteries arranged in the chamber 105. The cavity has an outlet 104 regulated by a relief valve to relieve excess pressure created when the heating of the battery heats up the water and turns it into a gaseous state, and to avoid the risk of explosion this water is drained through the drain valve. Preferably, the housing includes a jacket around the chamber 105. In a preferred embodiment, multiple cavities may be located around chamber 105. These cavities can be connected with one another or be separated from one another. In a preferred embodiment, a cavity for holding water can also be arranged in the door 102.

Each cavity is always thermally connected to the interior, the chamber 105.

Advantageously, the protective housing has a heat-insulating outer surface which prevents heat transfer from the outside into the chamber formed in the walls of the protective housing.

This is for the event that a fire develops outside and the heat of the fire vaporizes the water. If the battery and/or batteries in the chamber overheat, there will no longer be enough water to absorb that heat and there is a risk of the battery or the battery inside the space inside the protective box exploding.

The system can easily be filled with water to ensure that there are no leaks present.

A detection and/or signalling device can be attached to the outlet valve 103, which will trigger an alarm if vapours escape from the chamber(s). In this way it is signalled that there is overheating in the chamber 105 and/or in the protective housing.

Advantageously, the electrical connection to the interior, the chamber 105, can also be interrupted by this escape of steam in order to interrupt the power supply and thus reduce the risk of overheating and/or destruction of the battery in the interior chamber 105.

In the case of batteries used as energy reserves, e.g. for photovoltaic systems, there can be several interior spaces in which the individual units are housed, and thus one or more chambers with water, which absorbs the heat generated in the event of a malfunction in the interior.

These systems are preferably not accessible from the outside so that nobody can access the batteries.

The water placed in the cavities with at least one surface in thermal contact with the chamber 105 can absorb at least 30% more thermal energy than the energy present in the batteries, accumulators and/or charging cells placed in the chamber 105.

The variants of the system with the method described above only serve to provide a better understanding of the method, the mode of operation and the properties of the solution presented; they do not restrict the disclosure by the exemplary embodiments. The FIGURE is schematic to emphasize functions, operating principles, configurations and technical characteristics. Accordingly, each function, principle, technical configuration and characteristic disclosed in the FIGURE or in the text can be used freely and can be combined in any way with all claims, each characteristic in the text and in the other functions, principles, configurations and technical characteristics that are contained in this disclosure or result from it, are combined, so that all conceivable combinations of the solution described can be assigned. This also includes combinations between all individual representations in the text, i. e. on each page of the text, in the claims and also combinations between different variants in the text, in the dimensions and in the figures. The details of the device and method presented previously are presented in the text; however, it should be noted that they can also be used independently and also freely combined with each other. The relationships between the individual parts and sections shown in the FIGURE, as well as their dimensions and proportions, are not to be understood as limiting. However, individual dimensions and proportions may differ from those shown. The claims do not limit the disclosure and thus the possible combinations of all the characteristics presented. All features characteristics are also disclosed here individually and in combination with all other characteristics.

REFERENCE NUMBERS

100 Protective housing
101 Body
102 Door
103 Check valve
104 Inlet channel
105 Chamber
106 Electrical connection
107 Electric cable
108 Outer surface of the housing
109 Inner surface of the housing

The invention claimed is:

1. A protective housing for one or more batteries said protective housing comprising:

a body defining at least one inner chamber configured to receive at least one battery, the at least one inner chamber having at least one surface forming at least one wall of the protective housing and the at least one surface having at least one cavity formed therein, in which water ($H_2O$) is present, the at least one cavity having at least one one-way outlet valve for relieving excess pressure and an inlet channel for filling the at least one cavity with the water, the at least one inner chamber having at least one connection via an electrical cable to an outside of the protective housing, and at least one inner surface of the protective housing forming the cavity in which the thermally conductive water is present, and the protective housing having at least one door for access to the inner chamber.

2. The protective housing according to claim 1, wherein each of the at least one cavity forming an outer surface of the at least one inner chamber is thermally insulated.

3. The protective housing according to claim 1, wherein the protective housing has a connection for the charging of at least one rechargeable battery.

4. The protective housing according to claim 1, wherein the at least one battery is arranged in a removable manner inside the protective housing.

5. The protective housing according to claim 1, further comprising a sensor and/or a signalling device connected downstream of the at least one one-way outlet valve in order to signal an escape of steam.

6. The protective housing according to claim 1, further comprising a second cavity inside the at least one door which is fillable with water.

7. The protective housing according to claim 1, wherein the at least one cavity with at least one surface in thermal contact with the at least one inner chamber is configured to hold a volume of water capable of absorbing at least 30% more thermal energy than an amount of energy present in the at least one battery arranged in the at least one chamber.

* * * * *